United States Patent [19]

Smith

[11] Patent Number: 4,489,617

[45] Date of Patent: Dec. 25, 1984

[54] QUALITY CONTROL METHOD

[75] Inventor: Stanley K. Smith, Fenton, Mich.

[73] Assignee: Eaton Corporation, Cleveland, Ohio

[21] Appl. No.: 398,021

[22] Filed: Jul. 14, 1982

[51] Int. Cl.³ .............................. G01L 5/26
[52] U.S. Cl. .............. 73/862.19; 73/862.53
[58] Field of Search ........... 73/9, 761, 862.19, 862.23, 73/862.24, 862.27, 862.51, 862.53, 117.2, 115

[56] References Cited

U.S. PATENT DOCUMENTS

| | | | |
|---|---|---|---|
| 3,765,233 | 10/1973 | Germann | 73/117.2 |
| 3,952,506 | 4/1976 | Hanson et al. | 73/117.2 |
| 4,144,746 | 3/1979 | Maringer et al. | 73/117.2 |
| 4,274,438 | 6/1981 | LaCoste | 73/9 X |
| 4,400,981 | 8/1983 | Aoyagi et al. | 73/862.51 |

FOREIGN PATENT DOCUMENTS 2509199  10/1975  Fed. Rep. of Germany ..... 73/117.2

*Primary Examiner*—Charles A. Ruehl
*Attorney, Agent, or Firm*—C. H. Grace; M. L. Union

[57] ABSTRACT

A method of testing an assembly which is adapted to move in a predetermined motion through a cycle including the steps of applying a controlled force to the assembly, dividing each cycle of the assembly into a plurality of increments, sensing the force applied to the assembly during each increment, sensing the difference between the highest force and the lowest force sensed during a particular increment, setting a differential force limit for a particular increment and comparing the sensed difference between the highest and lowest force sensed during a particular increment with the set differential force limit and generating a first signal representative of an unacceptable assembly if the sensed differential force is not within the differential force limit.

22 Claims, 2 Drawing Figures

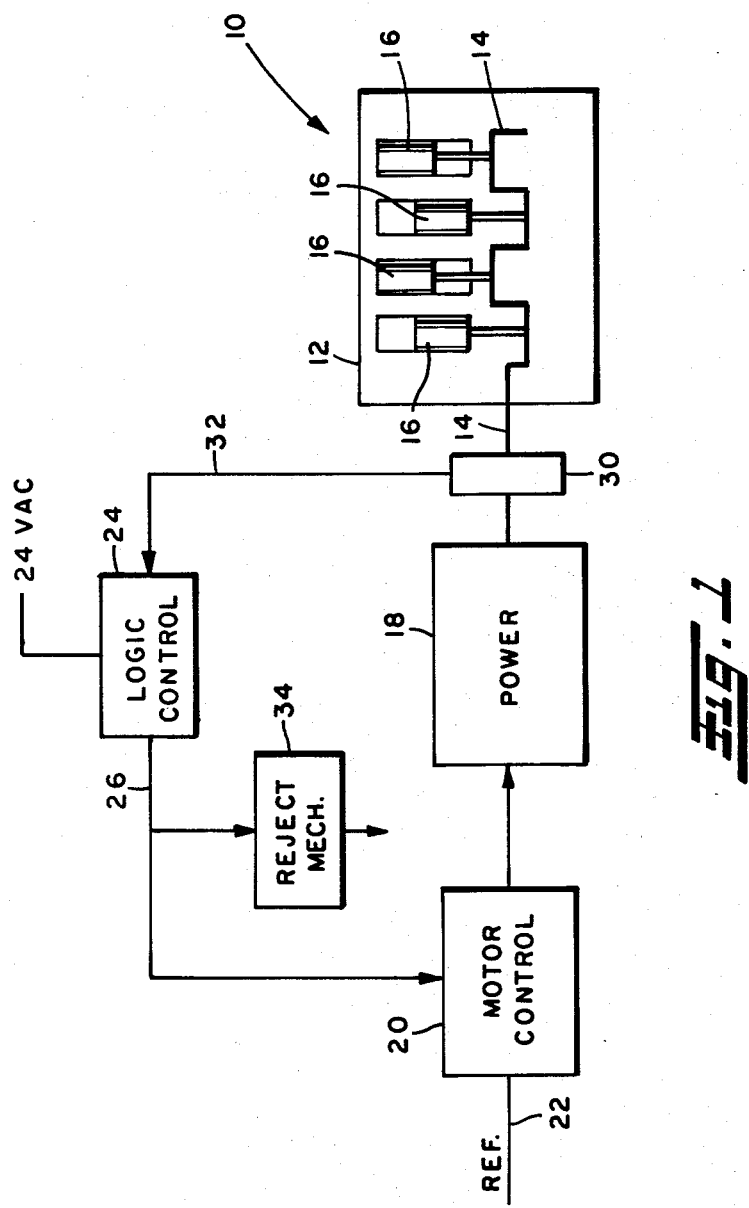

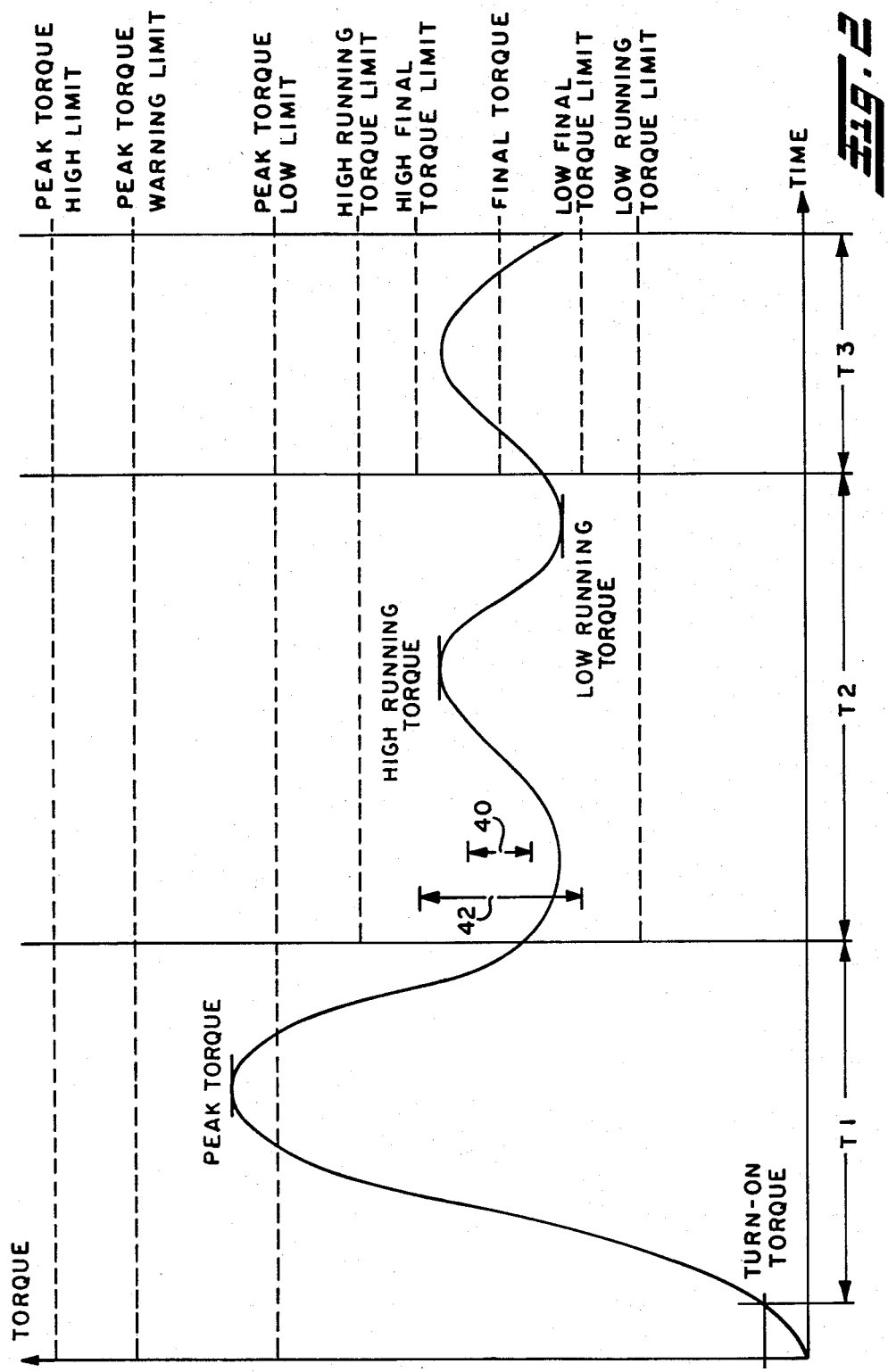

QUALITY CONTROL METHOD

BACKGROUND OF THE INVENTION

1. Field of the Invention

The present invention relates to a method of testing an assembly which is adapted to move through a cycle and more particularly, a method of testing an assembly by sensing the applied forces to effect movement of the assembly at various points in the cycle and utilizing the sensed information to determine whether the assembly meets predetermined quality standards.

Methods of testing completed assemblies, such as engines or motors, are well known in the art. These methods include the steps of operating the motors and and/or assembled parts to be tested while sensing such variables as starting torque, running torque, operating temperature, and electrical characteristics such as voltage and current in an effort to perform quality control operations on the assemblies. However, the known methods do not provide for determining running torque over a period of time, or reading the running torque differential. The determination of running torque over a time period allows a user to measure the bearing drag on items like four-cylinder engines by observing the low point on running torque. Additionally, by measuring differential torque a user can measure the piston ring draft directly.

2. Prior Art

The Eshghy U.S. Pat. No. 4,267,629 entitled Tension Control of Fasteners discloses a method for tensioning a threaded joint by sensing the torque utilized to tighten the joint over various angles of rotation of the nut. The Eshghy patent has not been utilized for quality control of mechanical assemblies other than threaded fasteners. The Brown et al U.S. Pat. No. 4,102,182 entitled Quality Checking System for a Thread Fastener Assembly also discloses an additional method of performing joint analysis by analyzing the torque angle signature of the joint as it is tightened. Brown does not disclose the quality control testing of a mechanical assembly.

SUMMARY OF THE INVENTION

Accordingly, it is a provision of the present invention to provide a new and improved method of testing an assembly which is adapted to move in a predetermined motion through a cycle including the steps of applying a controlled force to move said assembly through a cycle, dividing each cycle of the assembly into a plurality of increments, sensing the force applied to the assembly during each increment of the cycle, sensing the difference between the highest force and the lowest force sensed during a particular cycle increment, setting a differential force limit for a particular increment indicative of the permissible difference between the highest force and the lowest force sensed during that particular increment and comparing the sensed difference between the highest and lowest force with the set differential force limit and generating a first signal representative of an unacceptable assembly if the sensed differential force is not within the differential force limit.

Another provision of the present invention is to provide a new and improved method of testing an assembly as set forth in the preceding paragraph further including the steps of sensing the peak value of the force applied to the assembly during the cycle, setting a high peak force limit and comparing the sensed force with said high peak force limit and generating a second signal representative of an unacceptable assembly if the sensed force exceeds the high peak force limit.

Still another provision of the present invention is to provide a method of testing a mechanical assembly which is adapted to be rotated through a cycle, including the steps of applying a controllable force to the mechanical assembly to rotate the assembly through a cycle, dividing each cycle of the assembly into a plurality of increments, sensing the force applied to the assembly during each increment, sensing the difference between the highest force and the lowest force sensed during a particular increment, setting a differential force limit for a particular increment indicative of the permissible difference between the highest force and lowest forces sensed during that particular increment and comparing the sensed difference between the highest and lowest force during a particular increment with the set differential force limit and generating a first signal representative of an unacceptable assembly if the sensed differential force is not within the differential force limit.

Still another provision of the present invention is to provide a new and improved method of testing a mechanical assembly as set forth in the preceding paragraph wherein the step of sensing the force applied to the assembly comprises the step of sensing torque applied to said assembly to effect rotation thereof and said step of dividing each cycle of the assembly into a plurality of increments includes the step of dividing the cycle of the assembly into a plurality of time increments or motion increments.

DESCRIPTION OF THE DRAWINGS

FIG. 1 is a schematic illustration of apparatus for affecting movement of a mechanical assembly, which is illustrated as an engine, through a cycle and means for monitoring the assembly to perform quality control testing thereon.

FIG. 2 is a torque-time graph illustrating a hypothetical torque-time signature for a tested assembly.

DESCRIPTION OF THE PREFERRED EMBODIMENT

Referring to FIG. 1 a mechanical assembly 10 which is to be tested for quality control is illustrated. The mechanical assembly 10 is illustrated as an engine 12 including a crankshaft 14 and a plurality of pistons 16 therein. Rotating the crankshaft 14 and sensing the torque applied thereto over a complete cycle of the engine 12 enables certain parameters to be measured which will be indicative of the quality of the engine 12. The amount of torque which is required to effect rotation of the crankshaft 14 will be dependent on the physical characteristics of the engine 12. In addition, the amount of torque required to effect rotation of the crankshaft will vary through the cycle. Thus, sensing the torque required to effect rotation of the crankshaft at various intervals of the cycle will generate a torque-time or torque-movement signature which can be compared with a reference signature to determine if the quality of the tested assembly is acceptable. For example, if there are bad bearings or a scored piston in the engine 12, higher forces will be required to effect rotation of the crankshaft 14 during particular portions of the cycle. Sensing the torque applied to the crankshaft 14 as the crankshaft 14 is rotated through various increments of the cycle, enables various characteristics of the engine to be sensed for quality control.

The crankshaft of the engine 12 is adapted to be rotated by a prime mover 18 which preferably is an electric motor. A suitable motor control 20 is provided for energizing the motor 18 to effect controlled rotation of the crankshaft 14 of the engine 12. The motor control 20 includes a reference input 22 which effects energization of the motor 18 in accordance with the reference control signal applied on line 22. The operation of the motor control 20 and motor 18 is well known in the art.

A logic control or programmable controller 24 is provided to determine if an unacceptable mechanical assembly is tested. A control line 26 interconnects the logic control 24 and motor control 20 and is operable to have stop signals established thereon to shut down the motor control 20 in the event that an acceptable mechanical assembly is tested. Additionally, line 26 may be connected to a reject mechanism 34 as is disclosed in FIG. 1, which will be operable to mechanically reject a tested assembly such as the motor 12, if the tested assembly is found to be unacceptable.

Means are provided for measuring the force applied to the mechanical assembly as the mechanical assembly is moved through one complete cycle. In the preferred embodiment, the force measurement is effected by a torgue transducer 30 which is utilized to sense the force or torque applied to the crankshaft 14 by the motor 18. The torque transducer 30 directs it torque signal via line 32 to the programmable controller 24.

The programmable controller 24 is operable to sense the torque signal on line 32 and includes an additional input which is indicative of the cyclic motion of the mechanical assembly to be tested. The additional input can be position, time or angle of rotation. Each mechanical assembly to be tested is moved through at least one complete cycle during the testing procedure. If the mechanical assembly to be tested is rotated through a complete cycle such as would be required for testing an engine or motor, the complete cycle will be divided into a plurality of predetermined increments. The predetermined increments can be angular incremental movements for a rotating assembly such as an engine or a motor or could be time increments wherein the time periods required to complete one complete cycle of the mechanical assembly is divided into a plurality of incremental time periods during which the torque or force required to effect rotation or movement of the assembly is measured. While the present invention is described and illustrated as relating to rotatable assemblies, it should be appreciated that assemblies which exhibit linear movement, such as a linear motor, could also be tested. The linear movement for one complete cycle would be broken into a plurality of linear incremental movements or into a plurality of incremental time periods which would make up one complete cycle. For the purposes of illustration, the cycle of the engine 12 has been broken into a plurality of incremental time periods which periods would be timed by the logic control 24 upon initial movement of the engine 12 to be tested by the motor 18.

FIG. 2 illustrates a typical torque-time curve which is developed by the programmable controller 24 as a result of the testing of a mechanical assembly which is moved through a cycle over a time period. The programmable controller 24 samples the torque signal from the torque transducer 30 over a cycle of the engine 12 and monitors peak torque signals, running torque signals, differential torque signals and final torque signals over predesigned portions or increments of each cycle. The peak torque signal, running torque signal, differential torque signal and final torque signal are compared with preset limits which are programmed into the programmable controller 24 to determine whether the tested mechanical assembly is within the preset limits and therefor an acceptable mechanical assembly. If the signals are not within the preset limits it will be indicative of an unacceptable mechanical assembly and a stop or reject signal will be established by the logic control 24 on line 26.

The typical operating curve disclosed in FIG. 2 is divided into three incremental time periods identified as T1, T2 and T3. During time period T1, the peak torque is monitored and compared with a high peak torque limit and a peak torque warning limit. If the high peak torque limit is exceeded during T1, the mechanical assembly being tested will be found to be unacceptable. If the peak torque warning limit is exceeded, a signal will be generated by the logic control 24 indicative of the fact that the peak orque warning limit has been exceeded. A light can be lit by the logic controller 24 when the peak torque warning limit is exceeded to indicate to an operator that the peak torque high limit is being approached. The peak torque high limit and peak torque warning limit are also monitored during the time intervals T2 and T3 and the logic controller 24 will be operable to reject a mechanical assembly being tested whenever the peak torque high limit is exceeded in the time increment T1, T2 or T3. In addition, a peak torque low limit will be monitored during the time ranges T1, T2 and T3. The torque sensed will vary through the cycle and it is possible that the initial peak torque sensed by the logic control 24 during the interval T1 could be replaced by a new higher peak torque sensed during T2 or T3 if such higher peak torque was sensed. If the peak torque low limit is not exceeded by the sensed peak torque, then the programmable controller 24 will operate to reject the mechanical assembly.

During the time intervals T2 and T3 the programmable controller 24 will monitor the running torque. The running torque will be an instantaneous peak torque or instantaneous low torque value sensed during the time intervals T2 and T3 and will be compared with a set high running torque limit and a set low running torque limit. Additionally, the programmable controller will store the difference between the sensed high running torque and the sensed low running torque during the time intervals T2 and T3.

The programmable controller 24 will also operate to determine the differential torque during the time intervals T2 and T3 which is the difference between the sensed high running torque and sensed low running torque during time intervals T2 and T3. A differential torque low limit indicated at 40 in FIG. 2 which is defined as the minimum permissible difference between the actual sensed high running torque and actual sensed low running torque during the time intervals T2 and T3 will also be set. A differential torque high limit, indicated at 42 in FIG. 2, which is defined as the maximum permissible difference between the actual sensed high running torque and actual sensed low running torque will be set in the programmable controller 24. If the differential torque low limit 40 or differential torque high limit 42 is exceeded during time intervals T2 or T3, then the tested mechanical assembly will be found to be unacceptable and the reject mechanism 34 may be actuated to reject the tested unacceptable assembly.

During time period T3, the peak torque, high and low running torque and differential torque will also be monitored as explained hereinabove with respect to time periods T1 and T2. Additionally, the final torque, which is defined as the average torque over the time interval T3 will also be monitored and a high final torque limit and a low final torque limit will be set in the programmable controller 24 for the time increment T3. The final torque will be compared with the high and low final torque limit and the tested assembly rejected if the final torque exceeds the high final torque limit or does not exceed the low final torque limit. A tested mechanical assembly will be considered to be unacceptable if the high final torque limit is exceeded by the actual final torque sensed during the time interval T3 or if the low final torque limit is not exceeded by the actual final torque sensed during the time interval T3.

In determining peak torque, the logic controller 24 continuously compares the input torque signal sensed by the transducer 30 with the peak torque signal previously stored in the logic controller 24. If he new sensed input peak torque signal is larger than the peak torque signal previously stored in the logic controller 24, then the new signal replaces the previous stored peak torque signal. This test is performed continuously throughout the cycle, T1+T2+T3, to determine if the high peak torque limit is exceeded or the peak torque warning limit is exceeded.

During the time period T2 and T3, the sensed torque is compared against the largest and smallest running torque signals previously stored in the programmable controller 24. If the new sensed torque is larger or smaller, it replaces the corresponding old value of the high running torque or low running torque actually sensed during T2 and T3. All of the above described measurements are performed repeatedly while the programmable controller is monitoring a testing cycle. A testing cycle is terminated when T3 expires or upon a certain predetermined movement indicative of a complete cycle of the mechanical assembly to be tested. When a cycle is terminated the average final torque signal and the sensed differential torque can be calculated by the programmable controller 24 and either recorded or displayed by the programmable controller 24.

The user of the present invention can define an acceptable peak torque limit, running torque limit, final torque limit and differential torque limit for cyclic operations of the mechanical assembly to be tested. Operator set points in the programmable controller 24 can include full scale, high running torque limit, low running torque limit, high differential torque limit, low differential torque limit, peak torque high limit, peak torque low limit, high final torque limit, low final torque limit, T1 duration, T2 duration, T3 duration and leading edge turn on values. Because of this, each user operation can be particularly controlled to meet the requirements of the particular mechanical assembly to be tested.

While the present invention has been illustrated as dividing a cycle into time periods, it should be apparent that the cycle of the mechanical assembly could also be divided into incremental movements wherein the sum of the incremental movements are equal to a complete cycle of movement of the mechanical assembly. Thus, the graph plotted in FIG. 2 could be a torque-movement or position graph rather than a torque-time graph.

The operator sets the various torque limits for the increments of the cycle through which the mechanical assembly to be tested is moved. The reject limits can be indicative of the characteristics of the mechanical assembly to be tested. For example, if it was desired to test a four-cylinder engine for quality control, the determination of running torque during the time periods T2 and T3 would allow a user to measure bearing drag. During T2 and T3 particular point will be reached in the rotation of the crankshaft 14 of a four-cylinder engine wherein two of the pistons will be at their uppermost position and two will be at their lowermost position as is illustrated in FIG. 1. During this time when the pistons are at their highest and lowest positions, the pistons will stop and change directions and the torque required to effect rotation of the crankshaft will be independent of piston drag and will be a direct measurement of bearing drag. Thus, the low point on the running torque curve (indicated as low running torque) which occurs when two of the pistons are at their uppermost position and two of the pistons are at their lowermost position will be a measurement of bearing drag. If the bearing drag or low point on the running torque curve does not exceed a certain low running torque limit or exceeds a certain high running torque limit, it will be indicative of bad bearings. Additionally, by measuring differential torque, a measurement of piston ring drag can be made directly. When all of the pistons 16 in the engine block are at their mid-points in the cylinder, the highest load from the piston rings should be present. This should correspond to the high torque during time T2 on the torque time curve. The high torque should be indicative of the friction from the bearing rings and if the high point exceeds a predetermined high running torque limit or does not exceed a low running torque limit then the assembly can be rejected. One or two cylinder engines could be tested in a similar manner.

On larger engines such as 6 or 8 cylinder engines, the engines can be tested for bearing drag after the crankshaft is assembled but prior to assembly of the pistons and rods. The sensed high peak torque will be indicative of a bearing shell being too tight. Additionally, the differential torque should be relatively small for an acceptable assembly. If the differential torque is high, it will be indicative of uneven bearing loading and un unacceptable assembly. After the pistons and rods are assembled, the rod bearings and piston to cylinder spacing can be tested. A high peak torque reading or a high differential reading will be indicative of an unacceptable rod bearing. Additionally, if the piston to cylinder spacing is not proper, a high differential torque measurement will occur. This is due to movement and stopping of the pistons 16 within the cylinders as the crankshaft 14 is rotated. After the cam shaft is assembled, new measurements can be made to determine if the camshaft bearings have the proper drag. Again, sensing peak and differential torque will allow the camshaft bearings to be tested for quality.

As the engine is assembled and tested, the programmable controller 24 can store all of the critical readings and then substract the former readings from the latter to provide data on the additional parts assembled to the engine since the last measurement. The difference between the former readings and the latter readings will be a differential measurement which is indicative of the additional torque required for the added drag caused by the additional parts to the assembly.

Other mechanical assemblies such as transmissions, rear axles and gear boxes can be tested using the present method. For example, on a transmission, the assembly can be tested each time a gear is added to the assembly. If this is done, the peak bearing drag can be sensed and a tight gear can be identified using the peak sensed torque and the differential torque. Additionally, a high differential torque could be indicative of a single bad tooth on a gear.

Hydraulic pumps and rotors could also be tested using the present method. The drag and fit of the bearings and pumping parts can be measured by sensing peak torque and differential torque. Turbine engines and tubochargers can be similarly tested for bearing and oil pump drag. Additionally, by measuring torque as the item is assembled and comparing the data at various stages, the drag of the last added component can be sensed.

It should be appreciated that various other mechanical assemblies could be tested for quality control operations. The user will enter predetermined limits or set points into the programmable controller 24 and the programmable controller will then compare the set points with the various measurements actually sensed during movement of the assembly through a particular cycle. This will enable the operator to test for quality control in various types of mechanical assemblies which move through cyclic motions.

From the foregoing, it should be apparent that a new and improved method of testing an assembly which is adapted to move in a predetermined motion through a cycle has been disclosed. The method of testing an assembly includes the steps of applying a controlled force to the assembly to move the assembly through a cycle. The controlled force is provided by the motor 18. Each cycle is then divided into a plurality of increments which can be time increments or distance increments and the force applied to effect movement of the assembly is sensed during each of the increments of the cycle. The logic control then senses the difference between the highest force and lowest force sensed during a particular increment and this is compared with a set differential force limit for the particular increment which is indicative of a permissible difference between the highest and lowest force sensed during that particular increment. The sensed difference is then compared with the set differential force limit and a first signal is generated which is representative of an unacceptable assembly if the sensed differential force is not within the set differential force limit. In addition, the method includes the steps of sensing the peak value of force applied to the assembly during the cycle and comparing the sensed peak value with a set high peak force limit and generating a second signal representative of an unacceptable assembly if the sensed force exceeds the high peak force limit. A final high force limit, a final low force limit, and high running torque and low running torque limits are also set by the operator. The limits are compared with the sensed forces and signals representative of an unacceptable assembly are generated by the logic control 24 if the sensed forces exceed the particular set limits during the particular increment. Thus, a method of testing an assembly has been provided.

I claim:

1. A method of testing an assembly which is adapted to move in a predetermined motion through a cycle, comprising the steps of:

applying a controlled force to said assembly to move said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, comparing said sensed difference between the highest and lowest force sensed during a particularly increment with said set differential force limit and generating a first signal representative of an unacceptable assembly if said sensed differential force is not within the differential force limit, sensing the peak value of the force applied to said assembly during said cycle, setting a high peak force limit, and comparing said sensed force with said high peak force limit and generating a second signal representative of an unacceptable assembly if said sensed force exceeds said high peak force limit.

2. A method of testing an assembly which is adapted to move in a periodic motion through a cycle, as defined in claim 1, further including the steps of:

setting a peak force warning limit which is less than said high peak force limit and, comparing said sensed force during each increment of the cycle with said peak force warning limit and generating a third signal if said sensed force exceeds said peak force warning limit.

3. A method of testing an assembly which is adapted to move in a predetermined motion through a cycle, as defined in claim 1, wherein said step of sensing the peak value of the force applied to said assembly during said cycle includes the steps of:

sensing the peak value of force applied to said assembly during each increment of said cycle, storing the highest peak value of force applied to said assembly during the preceding increments of said cycle, comparing said sensed peak value of force for a particular increment with the stored highest peak value of force applied to said assembly during the preceding increments and replacing and storing the highest peak value of force sensed in the particular increment if the highest peak force value for the particular increment exceeds the previously stored highest peak value of force.

4. A method of testing an assembly which is adapted to move in a predetermined motion through a cycle, comprising the steps of:

applying a controlled force to said assembly to move said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, and comparing said sensed difference between the highest and lowest force sensed during a particularly increment with said set differential force limit and generating a first signal representative of an unacceptable assembly if said sensed differential force is not within the differential force limit, said step of setting a differential force limit includes the step of setting a high differential force limit for a particular increment of said cycle indicative of the maximum permissible difference between the highest and lowest force sensed during a particular increment, and the step of setting a low differential force limit for a particular increment of said cycle indicative of the minimum permissible difference between the highest and lowest force sensed during a particular increment, said step of comparing said sensed difference with said set differential force limit including the step of comparing said sensed difference between the highest and lowest force sensed during a particular increment with said set high differential force limit and generating a second signal indicative of an unacceptable assembly if said high differential force limit is exceeded, and the step of comparing said sensed difference between the highest and lowest force sensed during a particular increment with said set low differential force limit and generating a third signal indicative of an unacceptable assembly if said low differential force limit is exceeded.

5. A method of testing an assembly which is adapted to move in a predetermined motion through a cycle, as defined in claim 4, wherein the step of dividing each cycle of said assembly into a plurality of increments includes the step of dividing a cycle of said assembly into a plurality of incremental movements or linear movements.

6. A method of testing an assembly which is adapted to move in a predetermined motion though a cycle, comprising the steps of:

applying a controlled force to said assembly to move said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, and comparing said sensed difference between the highest and lowest force sensed during a particulary increment with said set differential force limit and generating a first signal representative of an unacceptable assembly if said sensed differential force is not within the differential force limit, said step of dividing each cycle of said assembly into a plurality of increments includes the steps of dividing a cycle of said assembly into a plurality of incremental movements or linear movements.

7. A method of testing an assembly which is adapted to move in a predetermined motion through a cycle, as defined in claim 6, wherein the step of dividing a cycle of said assembly into a plurality of incremental movements includes the step of dividing the cycle of said assembly into a plurality of incremental angular movements.

8. A method of testing an assembly which is adapted to move in a predetermined motion through a cycle, as defined in claim 6, wherein the step of dividing a cycle of said assembly into a plurality of incremental movements includes the step of dividing the cycle of said assembly into a plurality of incremental linear movements.

9. A method of testing an assembly which is adapted to move in a predetermined motion through a cycle, comprising the steps of:

applying a controlled force to said assembly to move said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, comparing said sensed difference between the highest and lowest force sensed during a particulary increment with said set differential force limit and generating a first signal representative of an unacceptable assembly if said sensed differential force is not within the differential force limit, said step of dividing each cycle of said assembly into a plurality of increments includes the steps of:

establishing a time period for the completion of one cycle of said assembly upon the application of said controlled force, and dividing the established time period for a cycle of said assembly into a plurality of incremental time periods.

10. A method of testing a mechanical assembly which is adapted to be rotated through a cycle comprising the steps of:

applying a controllable force to said mechanical assembly to rotate said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, and comparing said sensed difference between the highest and lowest force sensed during a particular increment with said set differential force limit and generating a first signal representative of an unacceptable assembly if said sensed differential force is not within the differential force limit, said step of dividing each cycle of said assembly into a plurality of increments including the step of dividing a cycle of said assembly into a plurality of incremental movements.

11. A method of testing a mechanical assembly which is adapted to be rotated through a cycle as defined in claim 10, wherein said step of dividing a cycle of said assembly into a plurality of incremental movements includes the step of dividing a cycle of said assembly into a plurality of incremental anugular movements.

12. A method of testing a mechanical assembly which is adapted to be rotated through a cycle comprising the steps of:

applying a controllable force to said mechanical assembly to rotate said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, and comparing said sensed difference between the highest and lowest force sensed during a particular increment with said set differential force limit and generating a first signal representative of an unacceptable assembly if said sensed differential force is not within the differential force limit, said step of dividing each cycle of said assembly into a plurality of increments includes the steps of establishing a time period for the completion of one cycle of said mechanical assembly upon the application of said controlled force thereto, and dividing the established time period for a cycle of said assembly into a plurality of incremental time periods.

13. A method of testing an assembly which is adapted to move in a predetermined motion through a cycle, comprising the steps of:

applying a controlled force to said assembly to move said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, comparing said sensed difference between the highest and lowest force sensed during a particulary increment with said set differential force limit and generating a first signal representative of an unacceptable assembly if said sensed differential force is not within the differential force limit;

sensing the peak value of the force applied to said assembly during said cycle;

setting a high peak force limit;

comparing said sensed force with said high peak force limit and generating a second signal representative of an unacceptable assembly, if said sensed force exceeds said high peak force limit;

setting a final high force limit for a particular increment of said cycle; and comparing said sensed force during said particular increment with said set high final force limit for that particular increment and generating a third signal representative of an unacceptable assembly when the set final high force limit is exceeded by said sensed force during said particular increment.

14. A method of testing an assembly which is adapted to move in a predetermined motion through a cycle, comprising the steps of:

applying a controlled force to said assembly to move said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, comparing said sensed difference between the highest and lowest force sensed during a particulary increment with said set differential force limit and generating a first signal representative of an unacceptable assembly if said sensed differential force is not within the differential force limit;

setting a final low force limit for the last increment of said cycle, and comparing said sensed force during said last increment with said set low final force limit for the last increment and generating a seventh signal indicative of an unacceptable assembly when the set low final force limit is not exceeded by said sensed force during said last increment.

15. A method of testing a mechanical assembly which is adapted to be rotated through a cycle comprising the steps of:

applying a controllable force to said mechanical assembly to rotate said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, comparing said sensed difference between the highest and lowest force sensed during a particular increment with said set differential force limit and generating a first signal representative of an unacceptable assembly if said sensed differential force is not within the differential force limit; and wherein said step of setting a differential force limit includes the steps of:

setting a high differential force limit for a particular increment which is indicative of the maximum permissible difference between the highest and lowest force sensed during that particular increment and setting a low differential force limit for a particular increment indicative of the minimum permissible difference between the highest and lowest force sensed during that particular increment.

16. A method of testing a mechanical assembly which is adapted to be rotated through a cycle as defined in claim 15, wherein said step of comparing said sensed difference between the highest and lowest force sensed during a particular increment includes the step of:

comparing the sensed difference between the highest and lowest force sensed during a particular increment with said set high differential force limit and said set low differential force limit and generating a second signal representative of an unacceptable assembly if said high differential force limit is exceeded or said low differential force limit is not exceeded.

17. A method of testing a mechanical assembly which is adapted to be rotated through a cycle comprising the steps of:

applying a controllable force to said mechanical assembly to rotate said assembly through a cycle, dividing each cycle of said assembly into a plurality of increments, sensing the force applied to said assembly during each increment of the cycle, sensing the difference between the highest force and the lowest force sensed during a particular increment, setting a differential force limit for a particular increment indicative of the permissible difference between the highest and lowest force sensed during that particular increment, comparing said sensed difference between the highest and lowest force sensed during a particular increment with said set differential force limit and generating a first signal representative of an unacceptable assembly if said sensed differential force is not within the differential force limit;

setting a final high force limit for the last increment of said cycle, comparing said sensed force during said last increment with said set high final force limit for the last increment, and generating a second signal representative of an unacceptable assembly when the set final high force limit is exceeded by said sensed force during said last increment.

18. A method of testing a mechanical assembly which is adapted to be rotated through a cycle as defined in claim 17, further including the steps of:

sensing the peak value of force applied to said assembly during said cycle, setting a high peak force limit, comparing said sensed force with said high peak force limit and generating a third signal representative of an unacceptable assembly if said sensed force exceeds said high peak force.

19. A method of testing a mechanical assembly which is adapted to be rotated through a cycle as defined in claim 18, further including the steps of:

setting a peak force warning limit which is less than said high peak force limit, and comparing said sensed force during each increment of the cycle with said peak force warning limit and generating a fourth signal if said sensed force exceeds said peak force warning limit.

20. A method of testing a mechanical assembly which is adapted to be rotated through a cycle as defined in claim 18, wherein said step of sensing the peak value of the force applied to said assembly during said cycle includes the steps of:

sensing the peak value of force applied to said assembly during each increment, storing the highest peak value of force applied to said assembly durihng the preceding increments, comparing said sensed value of force for a particular increment with the stored highest peak value of force applied to said assembly during the preceding increments and replacing and storing the highest peak value of force for the particular increment if it exceeds the previously stored highest peak value of force.

21. A method of testing a mechanical assembly which is adapted to be rotated through a cycle as defined in claim 17 further including the steps of:

setting a final low force limit for the last increment of said cycle, comparing said sensed force during said last increment with said set low final force limit for the last increment, and generating a fifth signal representative of an unacceptable assembly when the set low final force limit is not exceeded by said sensed force during said last increment.

22. A method of testing a mechanical assembly which is adapted to be rotated through a cycle as defined in claim 21, wherein the step of dividing each cycle of said assembly into a plurality of increments includes the steps of:

dividing a cycle of said assembly into a plurality of incremental movements.

* * * * *

UNITED STATES PATENT AND TRADEMARK OFFICE
CERTIFICATE OF CORRECTION

PATENT NO. : 4,489,617

DATED : December 25, 1984

INVENTOR(S) : Stanley K. Smith et al

It is certified that error appears in the above-identified patent and that said Letters Patent is hereby corrected as shown below:

On the title page inventors should read:

-- (75) Inventors: Stanley K. Smith, Fenton, Michigan, Curt D. Gilmore, Fenton, Michigan --.

Signed and Sealed this

Twenty-first Day of May 1985

[SEAL]

Attest:

DONALD J. QUIGG

Attesting Officer — Acting Commissioner of Patents and Trademarks